United States Patent [19]

Nägele et al.

[11] Patent Number: 4,934,810
[45] Date of Patent: Jun. 19, 1990

[54] METHOD AND APPARATUS FOR CONTROLLING THE QUANTITY OF EMITTED LIGHT IN AN OPTICAL MEASURING HEAD

[75] Inventors: Ulrich Nägele, Schwäbisch Gemünd; Horst Ballmer, Heidenheim; Berndt Kammleiter, Oberkochen; Klaus-Peter Koch, Aalen, all of Fed. Rep. of Germany

[73] Assignee: Carl-Zeiss-Stiftung, Heidenheim, Fed. Rep. of Germany

[21] Appl. No.: 286,748

[22] Filed: Dec. 19, 1988

[30] Foreign Application Priority Data

Dec. 21, 1987 [DE] Fed. Rep. of Germany ....... 3743363

[51] Int. Cl.$^5$ ............... G01C 3/00; G01C 5/00
[52] U.S. Cl. ........................... 356/1; 354/403; 356/376
[58] Field of Search ............ 356/1, 376; 354/403

[56] References Cited

U.S. PATENT DOCUMENTS

| | | |
|---|---|---|
| 3,612,890 | 10/1971 | Cornyn et al. |
| 4,375,921 | 3/1983 | Morander |
| 4,521,106 | 6/1985 | Lambeth ............................. 356/1 |
| 4,522,492 | 6/1985 | Masunaga ........................... 356/1 |
| 4,587,622 | 5/1986 | Herzog |
| 4,639,140 | 1/1987 | Lerat .................................. 356/376 |
| 4,674,869 | 6/1987 | Pryor et al. ......................... 356/1 |
| 4,708,483 | 11/1987 | Lorenz ............................... 356/376 |

FOREIGN PATENT DOCUMENTS

| | | |
|---|---|---|
| 3119505 | 1/1983 | Fed. Rep. of Germany |
| 3147129 | 1/1983 | Fed. Rep. of Germany |
| 3151800 | 4/1987 | Fed. Rep. of Germany |

*Primary Examiner*—Stephen C. Buczinski
*Attorney, Agent, or Firm*—Walter Ottesen

[57] ABSTRACT

The invention relates to a method and apparatus for controlling the quantity of emitted light in an optical measuring head. The control of the emitted light quantity of a laser diode mounted in the optical measuring head is dependent upon the stray light characteristics of the workpiece and is achieved by controlling the pulse width of the laser diode. The light pulses are synchronized with the machine clock frequency of the coordinate measuring apparatus on which the measuring head is fixedly mounted such that the center of the pulse coincides always with the counter strobe of the measuring system of the coordinate measuring apparatus.

11 Claims, 2 Drawing Sheets

METHOD AND APPARATUS FOR CONTROLLING THE QUANTITY OF EMITTED LIGHT IN AN OPTICAL MEASURING HEAD

BACKGROUND OF THE INVENTION

The optical distance measuring systems used in present day arrangements for making linear measurements as a rule operate according to the triangulation principle, that is, these systems include a light source which directs a measuring beam onto the object to be measured and a receiver optic is mounted so that its axis is inclined with respect to the beam axis. These distance measuring systems are often referred to as "optical measuring heads" and laser diodes are primarily used as beam sources therein. For receivers in such systems, either position-sensitive photodiodes connected to analog signal processors or receiver lines are used. The receiver lines can comprise a plurality of individual elements arranged one next to the other and these can be, for example, diode arrays or so-called CCD-arrays.

Especially with respect to receivers of the first-mentioned type, the problem occurs that the measurement precision is dependent upon the intensity of the measuring light which the receiver receives back from the surface of the workpiece. Since the intensity of the received light is however very dependent on the condition of the surface of the workpiece to be measured, an attempt must be made to maintain the level of the received measuring light constant via a control of the intensity of the beam source. Optical measuring heads which have such a control arrangement are disclosed, for example, in the following: German published patent applications No. 3,147,129 and No. 3,119,505; German Patent No. 3,151,800; and, U.S. Pat. Nos. 3,612,890 and 4,375,921.

In the known measuring heads, the control is achieved in that the intensity of the light emitted by the beam source is controlled either via the current of the light source or the transmittance of an electro-optic modulator connected ahead of the light source.

However, and especially when lasers are used as light sources, this kind of control has its limits with respect to the dynamic range is attainable. These limits are imposed since the non-linear current/power characteristic of laser diodes permits only slight deviations from the optimal operating point at which the laser diode is driven. Furthermore, the radiating characteristic of the laser diode changes and therefore the radiation profile changes with a change in the operating current. In the lower power range, the laser diodes furthermore have a high background component of spontaneous emission when compared to gas lasers. The two last-mentioned effects likewise act negatively on the measurement precision when current control is utilized.

It is further known to modulate the light sources in the measuring heads mentioned above. For this purpose, the duration of a cycle of the frequency is however constant since the modulation of the light source functions only to suppress constant disturbance light levels which otherwise would falsify the measuring result. This suppression is performed in combination with a so called phase sensitive detector (psd) tuned to the modulation frequency.

SUMMARY OF THE INVENTION

It is an object of the invention to provide a method and apparatus for controlling the quantity of emitted light of the beam source in an optical measuring head wherein the highest possible dynamic ranges can be obtained. It is a further object of the invention to provide such a method and apparatus which eliminates the above-mentioned disadvantages.

According to a feature of the method of the invention, the radiation source is pulse driven and the quantity of light emitted by the radiation source is adapted to the condition of the surface of the workpiece to be measured by controlling the pulse width.

With this kind of control, a dynamic range of $10^4$ is easily obtained. It is the on-time of the emitted light or the current of the light source which is varied for the control and not the amplitude of this emitted light or the current of the light source. Because of this condition, the beam source can always be driven in the optimal operating range of its characteristic which positively affects the measuring precision and the service life of the beam source.

The way the intensity is controlled according to the invention is therefore especially suitable in combination with a laser diode as a light source. As receivers, it is advantageous to utilize segmented diode lines or so-called CCD-arrays which are comprised of a plurality of individual elements. Such receivers display an integrating characteristic with respect to the quantity of light received between the read-out cycles and are therefore especially suitable in combination with a light quantity control by means of the pulse width.

When the measuring head incorporating the control arrangement according to the invention is operated on a coordinate measuring apparatus, it is then advantageous to synchronize the pulse frequency of the beam source with the clock frequency of the coordinate measuring apparatus. The same applies to the read-out clock frequency with which the photosensitive receiver of the measuring head is driven and the signals of which are indicative of the distance measuring values of the measuring head. The reciprocal synchronization assures that the measured values of the coordinate measuring system and the measuring head are obtained at the same time point so that contouring errors are prevented.

The nature of the synchronization of the pulse repetition rate at which the beam source transmits has a special role to fulfill in connection with the foregoing. Specifically, if only the starting edges of the control pulses for the beam source are synchronized with the system clock frequency of the coordinate measuring apparatus, a hysteresis effect can occur in the scanning operation (that is, during the continuous scanning of inclined surfaces) which, in addition, is dependent upon the time duration of the light pulses selected in correspondence to the condition of the surface of the workpiece. This hysteresis effect becomes manifest in that different measuring values for the distance of the workpiece are obtained in dependence upon whether one advances toward or moves away from the workpiece. In addition, this hysteresis effect is also dependent upon the travel speed or relative speed between the measuring head and the workpiece.

In a further embodiment of the invention, this effect can be prevented if a constant phase relationship is established between the centroids of the individual pulses of the beam source and the clock frequency of the coordinate measuring apparatus. This can be achieved in that the rising edge and falling edge of the control pulses for the light source are symmetrically advanced in time or delayed with a change in pulse width so that at the time point of acceptance of the measured value by the coordinate measuring apparatus just half of the pulse duration has passed.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
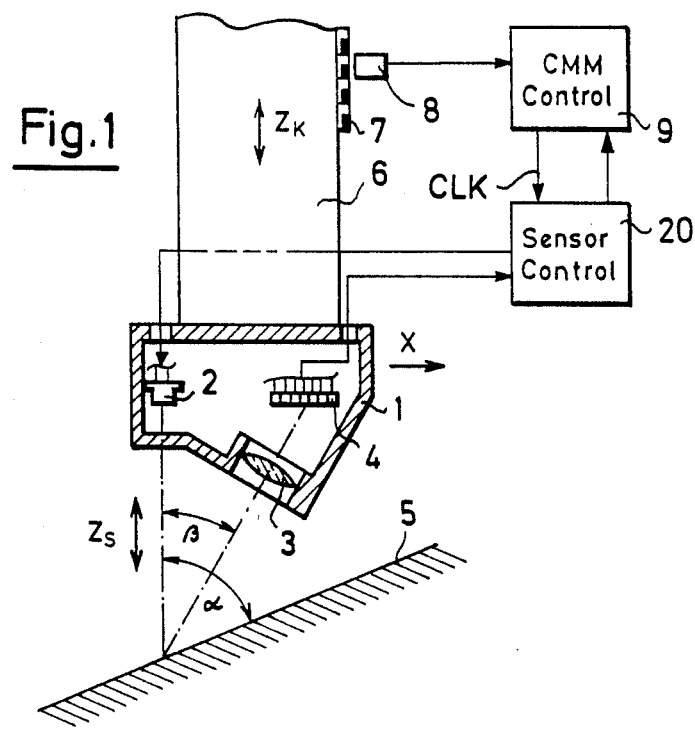
FIG. 1 is a simplified schematic representation which shows an optical measuring head attached to the measuring arm of a coordinate measuring apparatus.

In FIG. 1, an optical measuring head 1 operating according to the triangulation principle is illustrated and is attached to the measuring arm 6 of a coordinate measuring apparatus. The entire coordinate measuring apparatus is not shown since appropriate configurations therefor are shown in U.S. Pat. No. 4,587,622 incorporated herein by reference.

Only a part of the scale 7 and the photoelectric read head 8 corresponding thereto are shown to provide a clearer illustration. The measuring scale 7 measures the displacement of the measuring head 1 on the measuring arm 6 in the vertical direction. The reading head 8 is connected to the control 9 of the coordinate measuring apparatus as is the non-illustrated measuring system for measuring the displacement direction in the two remaining coordinates X and Y.

The optical measuring head 1 essentially comprises a beam source 2 in the form of a laser diode and a receiver optic 3 behind which a photoelectric receiver 4 is mounted which, in turn, comprises a plurality of individual elements. As the receiver 4, the photodiode array of the firm EG & G Reticon can be utilized which is commercially available from the latter as product no. RL 0256 S. The firm EG & G Reticon is a corporation organized and doing business in the United States of America.

The beam axis of the laser diode 2 and the optical axis of the detection optic 3 are inclined with respect to each other as indicated by the arrow 8. Because of this, the position of the light spot imaged by the optic 3 on the diode array 4 which the laser diode 2 projects onto the surface of the workpiece 5 is dependent upon the distance between the measuring head 1 and the workpiece 5. The corresponding measuring signal of the diode array 4 is processed in a control circuit 20 and is likewise supplied to the control 9 of the coordinate measuring apparatus. The control circuit 20 furthermore supplies the signal $U_p$ (refer to FIG. 2) which switches a constant current source for supplying the laser diode 2. The control circuit 20 is synchronized with the clock frequency from the control 9 of the coordinate measuring apparatus which is indicated in FIG. 1 by the arrow having the reference designation CLK.

Figure 2:
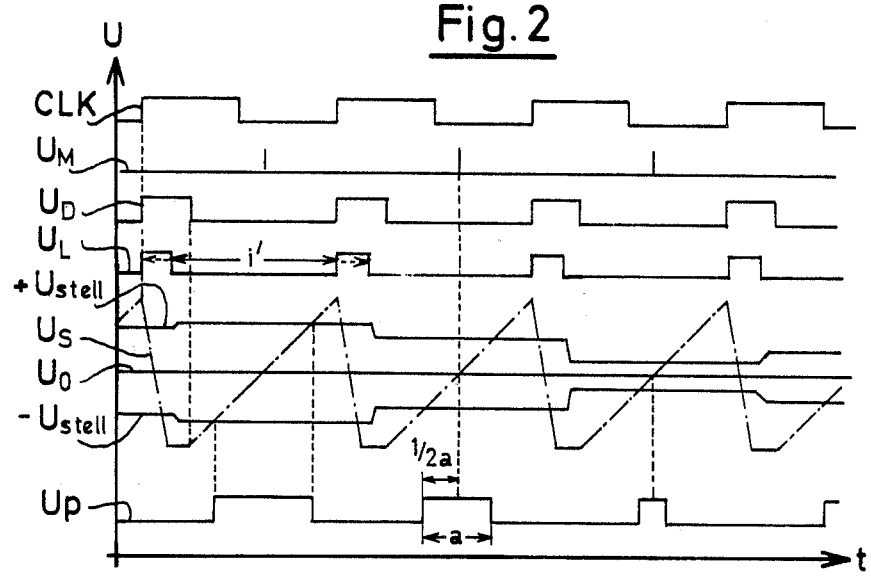
FIG. 2 is a diagram showing the time dependent course of different signals of the sensor control circuit of the optical measuring head of FIG. 1; and, FIG. 3 is a schematic block diagram of the sensor control circuit depicted in FIG. 1 by block 20.

In FIG. 2, the system clock frequency CLK is shown as a train of rectangular pulses. Beneath this pulse train, the pulse sequence $U_M$ is shown which is derived from the system clock frequency. The pulses $U_M$ define the point in time at which the measured values are obtained which are supplied by the scales along the displacement axes of the coordinate measuring apparatus.

Figure 3:
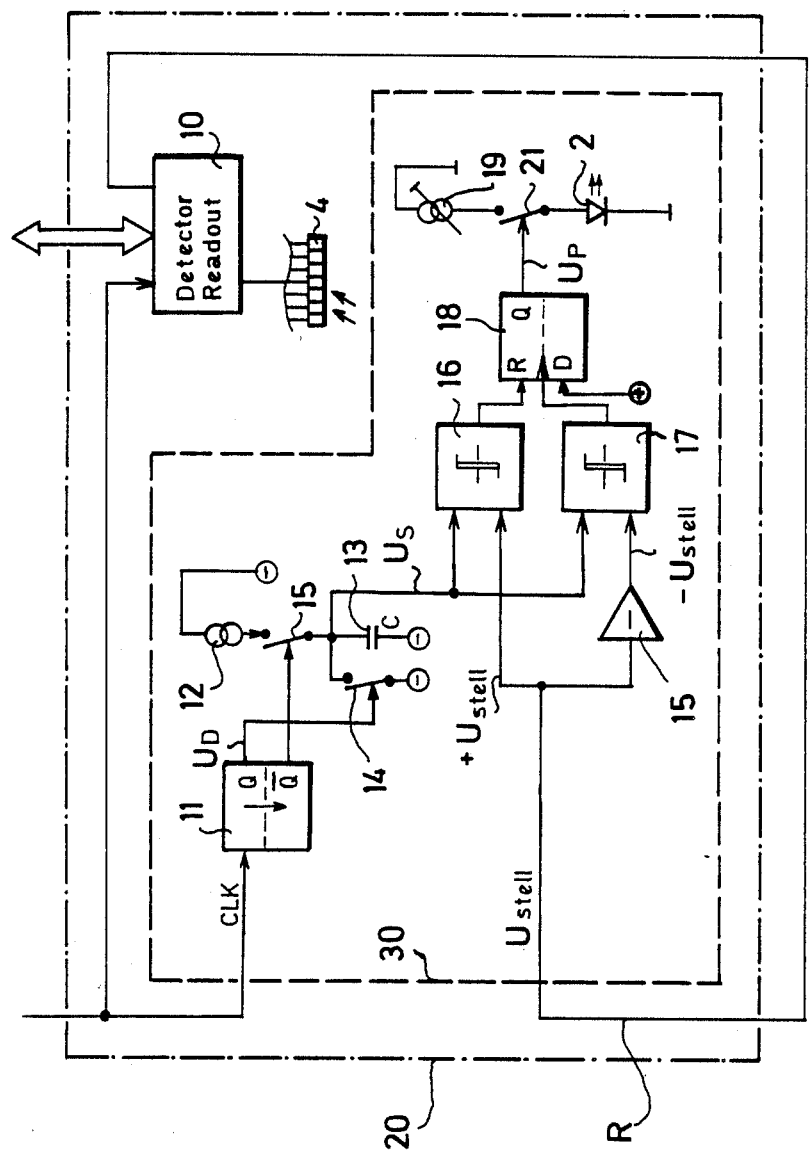

The wave form designated by reference character $U_L$ represents the read cycle by means of which the diode array 4 is driven by the control circuit identified in FIG. 3 by reference numeral 10. The phase shift between the read cycle of the diode array and the machine cycle CLK is so selected that the point in time at which the pulses $U_M$ of the counter strobe occur, causes these pulses $U_M$ to fall into the middle of the remaining free portion i' of the integration time of the photosensitive surfaces of the sensor 4.

To control the light intensity of the laser diode 2, the output of the read-out circuit 10 for the diode array 4 is connected via line R with the input of a control circuit 30. The output of the read-out circuit 10 supplies a signal that is proportional to the light intensity received by the diode array 4. The control circuit 30 generates the pulse sequence shown as the bottom most wave form in FIG. 2 and designated with reference character $U_P$ with the width (a) of the individual pulses $U_P$ being proportional to the output voltage $U_{stell}$ on the line R.

The synchronization between the read cycle $U_L$ of the diode array and the machine cycle CLK was undertaken in that only a constant phase shift was established between the leading edges of the pulse sequences. If now the synchronization between the illuminating pulses $U_P$ and with those pulses which the laser diode 2 radiates were performed in the same way, then measuring errors would occur during the scanning operation, that is, when the measuring head 1 is moved continuously with respect to the workpiece 5. This is explained below with reference to FIG. 1.

With a relative movement of the measuring head 1 in the direction of the measurement direction $Z_S$, the position of the image of the measuring spot on the diode array 4 becomes displaced in dependence upon the magnitude of the relative speed between the measuring head 1 and the workpiece 5. The elements of the diode array 4 integrate the light quantity received during one measuring cycle and a measuring value is generated from the individual diode signals by means of data reduction. With phase rigid coupling of the leading edges of the light pulses to the system clock frequency, the position of the imaged measuring spot on the diode array 4 is shifted in dependence upon the path which the measuring head passes through relative to the workpiece during the time duration in which the laser diode 2 transmits light. As mentioned above, this contour error is dependent upon the travel speed and the pulse width (a) of the light pulse of the laser diode 2. A measuring error of 0.1 mm can occur when, for example, a surface inclined at an angle of 45° to the travel direction X is scanned with a velocity of 40 mm/sec and the pulse width changes by 2.5 ms via the light quantity control of the laser diode 2. Such measuring errors cannot be tolerated for coordinate measuring apparatus which are intended to have a measuring uncertainty in the range of less than several micrometers. To avoid this error, the control circuit 30 in FIG. 3 operates so that even with variable pulse widths, the center of the light pulses of the laser diode 2 coincide with the pulses $U_M$ of the strobe. This is achieved in the manner described below.

In the circuit 30, a sawtooth generator is started by a clock frequency CLK which supplies a voltage $U_S$ which increases linearly with time and is symmetrical to the voltage $U_O$. The illustration of the sawtooth generator is simplified and includes a current source 12 and a capacitor 13. The capacitor 13 is cyclically controlled by a clock 11 and is charged via a switch 15 and short-circuited via a switch 14. The switching pulses at the output of the clock 11 are designated in FIG. 2 by reference character $U_D$. The sawtooth voltage $U_S$ is applied to the inputs of two comparators (16 and 17).

A control voltage $U_{stell}$ is derived from the light quantity received from the diode array and is applied to the second input of comparator 16. The negative control voltage $-U_{stell}$ is inverted via inverter 15 and is applied to the second input of the second comparator 17. The two comparators (16 and 17) each switch through when the sawtooth voltage $U_S$ and the two control voltages $U_{stell}$ and $-U_{stell}$ are equal to each other.

The outputs of the two comparators (16 and 17) are applied to a flip-flop 18 with the positive edge of the pulse generated by the comparator 17 switching the flip-flop 18 and the positive edge of the pulse generated by comparator 16 again resetting the flip-flop 18. In this way, the flip-flop 18 supplies pulses $U_P$ at the output whose leading and trailing edges even with different pulse widths always lie symmetrical to the time point at which the sawtooth generator voltage $U_S$ cuts the voltage $U_O$.

With these pulses $U_P$, the current source 19 for the laser diode 2 is switched on via the control transistor represented in simplified form by switch 21. The current source 19 is optimally adjusted to the characteristic of the laser diode 2 which is always operated in the most favorable operating region.

With the measures described above, the mean value of the light pulses always coincide with the time point under which the counter positions are read together with the measured values of the scales of the coordinate measuring apparatus. The above-mentioned hysteresis or the contour errors resulting therefrom in dependence upon velocity are thereby prevented.

An analog operating control circuit is shown in the illustrated embodiment. It is however clear that a purely digital control circuit can be used in lieu thereof.

It is understood that the foregoing description is that of the preferred embodiments of the invention and that various changes and modifications may be made thereto without departing from the spirit and scope of the invention as defined in the appended claims.

What is claimed is:

1. An optical measuring head for scanning a specimen to be measured such as a workpiece having a predetermined surface condition, the measuring head comprising:
   laser means for emitting light in the form of a laster beam directed toward the surface of the specimen whereat a light spot appears;
   modulation means for modulating said laser means to produce a train of laser beam pulses having respective pulse widths;
   a photosensitive receiver including a plurality of individual elements arranged one next to the other;
   optical means for imaging said light spot on said elements so as to cause said elements to receive an intensity of light which is dependent upon said surface condition;
   read-out means for supplying a signal proportional to the light intensity received by said photosensitive receiver at a predetermined frequency cycle; and,
   control means for driving said modulation means in response to said signal to adjust the width of each of said pulses in dependence upon said surface condition of the specimen while effectively holding the intensity of the light received by said receiver constant during subsequent readout cycles.

2. The optical measuring head of claim 1, said plurality of individual elements conjointly defining a diode array.

3. The optical measuring head of claim 1, wherein said pulse train $U_P$ is synchronized with the read-out clock frequency $U_L$ of said receiver.

4. The combination of said optical measuring head of claim 1 and a coordinate measuring apparatus, the combination comprising:
   said measuring head being mounted on said coordinate measuring apparatus in operative proximity to the specimen;
   said coordinate measuring system including a scale reading circuit operating in accordance with a predetermined system clock frequency CLK; and,
   synchronizing means for synchronizing said pulse train $U_P$ of said control means with said system clock frequency CLK.

5. The combination of claim 4, wherein: said pulse train $U_P$ is synchronized with said system clock frequency CLK such that the phase relationship between the centroids of the individual pulses of said laser means and said system clock frequency CLK is constant independently of said pulse width (a).

6. The combination of claim 5, said control means comprising:
   means for forming symmetrical voltages ($-U_{stell}$, $+U_{stell}$) symmetrical to a reference voltage $U_O$ having values proportional to the pulse width (a) of the pulses $U_P$ to be generated;
   generator means for generating a voltage pulse train $U_S$ wherein each pulse has a leading edge increasing linearly as a function of time;
   synchronizing means for synchronizing said voltage pulse train $U_S$ with said system clock frequency CLK; and,
   comparator means receiving said symmetrical voltages ($-U_{stell}$, $+U_{stell}$) and said voltage pulse train $U_S$ for comparing the same to each other to form and supply signals for determining the start time point and the finish time point for said pulses of variable width (a).

7. The combination of claim 5, said control means comprising:
   first generating means for generating a voltage $U_R$ proportional to the pulse width (a) of the pulses $U_P$ to be generated;
   second generating means for generating two time-linear voltages symmetrical to a voltage ($U_{stell}$);
   synchronizing means for synchronizing said two time-linear voltages with said system clock frequency CLK; and,
   comparator means for receiving said two time-linear voltages and said voltage $U_R$ for comparing the same to each other to form and supply signals for determining the start time point and the finish time point for said pulses of variable width (a).

8. A method for controlling the quantity of light emitted by a light source in an optical measuring head during a readout cycle of a photoelectrical receiver in said measuring head, said head being disposed in operative proximity to a specimen such as a workpiece having a predetermined light absorbing and reflecting surface condition, the method comprising the steps of:

driving said light source with a pulse train $U_P$ thereby generating light pulses of constant light intensity; and, controlling the width (a) of the pulses of said pulse train $U_P$ to adapt the quantity of light emitted by said light source to said surface condition so as to effectively hold the quantity of light received by said photoelectric receiver during a readout cycle substantially constant.

9. The method of claim 8, said measuring head being operated in combination with a coordinate measuring apparatus having a system clock frequency CLK, the method comprising the further step of: synchronizing the frequency of said pulse train $U_P$ with said system clock frequency CLK.

10. The method of claim 9, wherein the frequency of said pulse train is synchronized with said system clock frequency CLK such that the centroid of the individual pulses of said pulse train $U_P$ are in constant phase relationship to said system clock frequency.

11. The method of claim 9, wherein said measuring head includes a receiver comprising a diode array having a read-out clock frequency $U_L$ and wherein said read-out clock frequency is likewise synchronized with said system clock frequency.

* * * * *